United States Patent
Nanda et al.

(10) Patent No.: US 7,515,595 B2
(45) Date of Patent: Apr. 7, 2009

(54) NETWORK USING ENCODED TRANSMISSIONS AND FORWARDING

(75) Inventors: Sanjiv Nanda, Ramona, CA (US); Ranganathan Krishnan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 769 days.

(21) Appl. No.: 10/754,246

(22) Filed: Jan. 9, 2004

(65) Prior Publication Data

US 2005/0152293 A1 Jul. 14, 2005

(51) Int. Cl.
*H04L 12/28* (2006.01)
(52) U.S. Cl. .................... 370/400; 370/395.5
(58) Field of Classification Search .......... 370/310, 370/351, 400, 332, 130, 238, 356, 204, 395.5; 455/428; 709/240
See application file for complete search history.

(56) References Cited

U.S. PATENT DOCUMENTS

| | | | | |
|---|---|---|---|---|
| 2001/0056504 | A1* | 12/2001 | Kuznetsov | 709/310 |
| 2002/0172262 | A1* | 11/2002 | Sugaya et al. | 375/130 |
| 2003/0026268 | A1* | 2/2003 | Navas | 370/400 |
| 2004/0095920 | A1* | 5/2004 | Lippman et al. | 370/351 |
| 2005/0117546 | A1* | 6/2005 | Lioy et al. | 370/332 |

FOREIGN PATENT DOCUMENTS

WO WO 03/009608 A2 1/2003

OTHER PUBLICATIONS

Baldi et al, "Modeling and Optimization of UWB Communication Networks Through a Flexible Cost Function", Dec. 2002, pp. 1733-1744.
Hwang Y et al, An Adaptive Routing Protocol for AD_HOC Networks Using Multiple Disjoint Paths, May 6, 2001, pp. 2249-2253.
Radunovic et al, "Optimal Power Control, Scheduling and Routing in UWB Networks", Mar. 17, 2003, pp. 1-16.
Horie et al, Novel Packet Routing Scheme based on Location Information for UWB Ad-Hoc Network, Nov. 16, 2003, pp. 185-189.
Gong et al, "A New Piconet Formation Algorithm for UWB Ad Hoc Networks", Nov. 16, 2003, pp. 180-184.
Cuomo et al, "Radio Resource Sharing for Ad Hoc Networking with UWB", Dec. 2000, pp. 1722-1732.

\* cited by examiner

*Primary Examiner*—Nick Corsaro
*Assistant Examiner*—Shannon R Brooks
(74) *Attorney, Agent, or Firm*—Albert J. Harnois, Jr.; Florin Corie; Katherine Umpleby

(57) ABSTRACT

A first network node may include a wireless transmitter, a wireless receiver, a user interface and a controller. The controller may be configured to cause information that is received by the receiver to be delivered to the user interface, if that information is encoded to be delivered to the user interface of the network node. The controller may also be configured to cause information to be transmitted in a format encoded for a first target node by the transmitter, if that information is encoded to be forwarded by the network node. The controller may also be configured to cause information from the user interface to be transmitted in a format encoded for a second target node by the transmitter. Related processes are also disclosed.

53 Claims, 9 Drawing Sheets

NETWORK USING ENCODED TRANSMISSIONS AND FORWARDING

FIELD

This disclosure generally relates to communication systems, including network communication systems, wireless communication systems, cellular communication systems and ultra wide band communication systems.

BACKGROUND

A wide variety of communications takes place over a network. Many of these take place without connecting wires, such as in cellular communication systems.

It is often desirable to operate the transmitters in a wireless communication system at very low power. This may reduce the drain on the power supply, which may be a battery with a limited life. Lowering the transmission power level may also help reduce interference between multiple transmitters operating at the same time in nearby locations.

Unfortunately, transmitting at low power can often times have a drawback—it may be difficult to receive the transmitted signal over great distances.

Cellular networks often address this issue by installing base stations at numerous, strategic locations. These base stations may receive transmissions from local cell phones or other nodes and forward these transmissions to more distant locations.

Unfortunately, it can be costly to install and maintain base stations at all of the strategic locations at which they may be needed. The locations at which base stations are needed, moreover, may not always be known, due to the mobile nature of a cell phone. This can make full coverage even more difficult.

Ultra Wide Band (UWB) is a new technology that may allow numerous transmitters to operate at the same time and in the same band, without interfering with one another or with existing communications systems also operating within the same band. Many radio frequency ("RF") technologies use a carrier modulated only within a relatively narrow band to transmit information. UWB, on the other hand, sends pulses of energy across a broad spectrum of frequencies. Using this wideband technique, a UWB signal can be successfully transmitted at such a low power level that it can often exist in the same band as more narrow band RF technologies without significantly interfering with those narrow band transmissions.

Unfortunately, the transmission distance of UWB is also limited, particularly when the power level of the signal is low.

SUMMARY

A network node may include a wireless transmitter, a wireless receiver, a user interface and a controller. The controller may be configured to cause information that is received by the receiver to be delivered to the user interface, if that information is encoded to be delivered to the user interface of the network node. The controller may also be configured to cause information that is received by the receiver to be transmitted in a format encoded for a first target node by the transmitter, if that information is encoded to be forwarded by the network node. The controller may be configured to cause information from the user interface to be transmitted in a format encoded for a second target node by the transmitter.

A process of operating a network node may include receiving information at the network node. The received information may be delivered to a user interface in the network node when the information is encoded to be delivered to the user interface of the network node. The received information may be transmitted in a format encoded for a first target node when the information is encoded to be forwarded by the network node. Information from the user interface may be transmitted in a format encoded for a second target node.

It is understood that other embodiments will become readily apparent to those skilled in the art from the following detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

BRIEF DESCRIPTION OF DRAWINGS

Aspects are illustrated by way of example, and not by way of limitation, in the accompanying drawings, wherein.

DETAILED DESCRIPTION

The detailed description set forth below in connection with the appended drawings is intended as a description of various embodiments of the concepts that are presented and is not intended to represent the only embodiments in which these concepts may be practiced. Each embodiment described in this disclosure is provided merely as an example or illustration, and should not necessarily be construed as preferred or advantageous over other embodiments. The detailed description includes specific details for the purpose of providing a thorough understanding of the concepts that are presented. However, it will be apparent to those skilled in the art that these concepts may be practiced without these specific details. In some instances, well-known structures and devices are shown in block diagram form in order to avoid obscuring the concepts. Acronyms and other descriptive terminology may be used merely for convenience and clarity and are not intended to limit the scope of the concepts that are disclosed.

In the following detailed description, various aspects may be described in the context of a UWB and/or spread spectrum wireless communications system. While these aspects may be well suited for use with this application, those skilled in the art will readily appreciate that these inventive aspects are likewise applicable for use in various other communication environments. Accordingly, any reference to a UWB and/or spread spectrum communications system is intended only to illustrate the inventive aspects, with the understanding that such inventive aspects have a wide range of applications.

Figure 1:
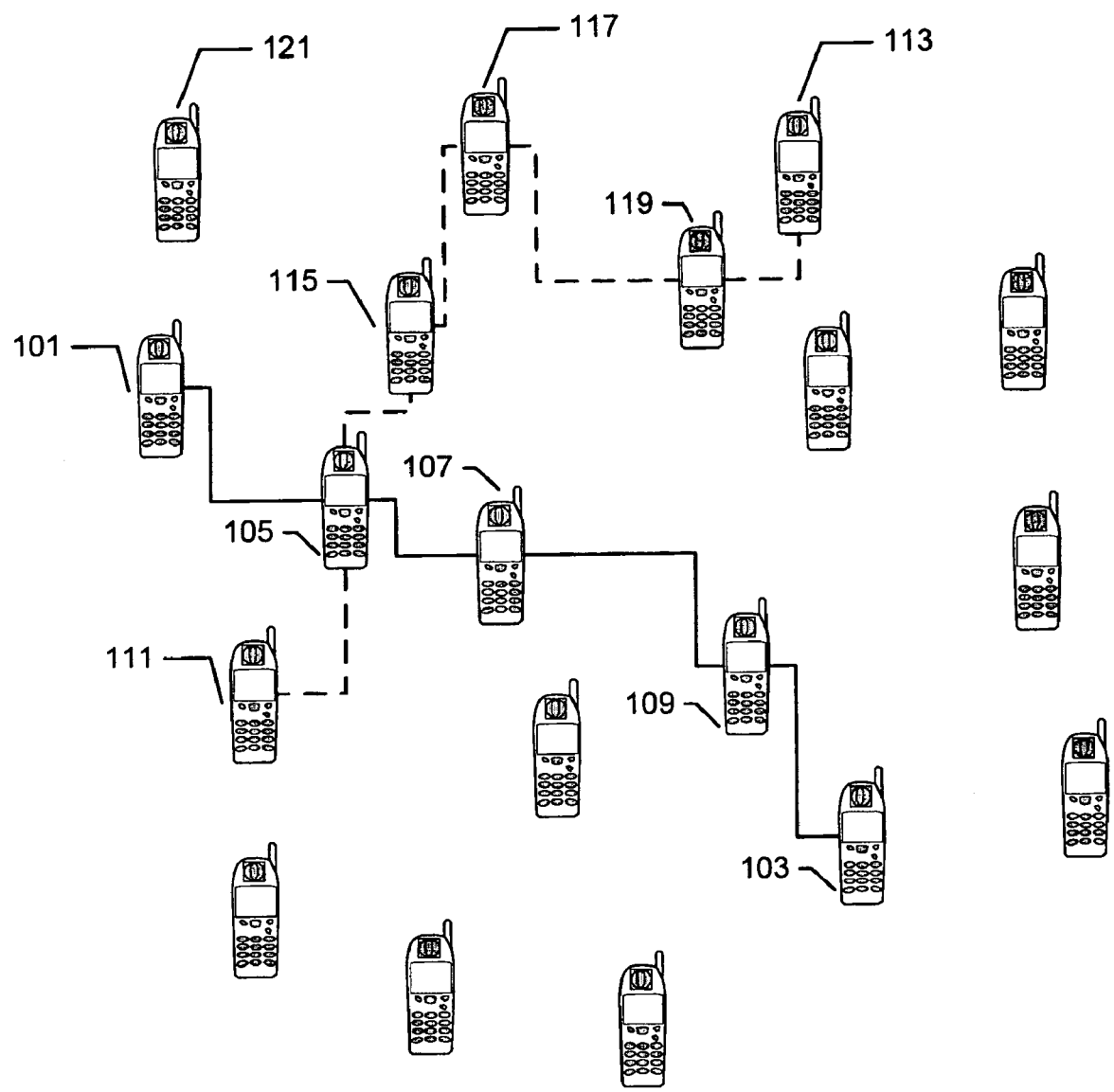
FIG. 1 illustrates a communication taking place over a portion of a network using encoded transmissions and forwarding.

FIG. 1 illustrates a communication taking place over a portion of a network using encoded transmissions and forwarding.

As shown in FIG. 1, a plurality of nodes, illustrated by way of example as cell phones, form a network.

The network may be an ad hoc network. This is a network whose nodes are not all the subject of careful planning and organization. Rather, the existence and location of each node may be unplanned and, indeed, even unforeseeable. One or more of the nodes may also be in motion at the time of communication, such as a node that is being carried by an operator on foot or in a vehicle, aircraft or ship. The node might even be carried by a vehicle, aircraft or ship without a human operator even being present.

Each node in the network may be of any type. It may be a cell phone, PDA, laptop, a military communication device or any other type of communication device. Cell phones are illustrated in FIG. 1 by merely as examples.

Each node may have a user interface that communicates information to its user and receives information from its user. Each user interface may include one or more input devices to receive information from the user, such as a keyboard, mouse, touch screen, microphone or camera. Each user interface may also include one or more output devices to communicate information to the user, such as a display, loud speaker, or headset. The user may be a person, animal, system or device.

Each node may be wireless, meaning that it may transmit and receive information from other nodes without interconnecting wires.

Each node may communicate with other nodes in the network without any type of centralized base station.

To communicate with a node that might be beyond the reach of the signal that is transmitted, the communication from the initiating node may be forwarded by one or more of the other nodes in the network to the destination node.

This forwarding concept is illustrated in FIG. 1. Specifically, initiating node 101 is shown as being in communication with destination node 103 by having the information that node 101 seeks to communicate to node 103 being forwarded, first by a node 105, then by a node 107, and finally by a node 109. The communication from the node 103 back to the node 101 may be forwarded along the same route, except in reverse order. The routing of this particular communication is illustrated in FIG. 1 as a solid line between the linked nodes.

Simultaneously, a node 111 may be in communication with a node 113 that again are too far apart for the communication to take place directly. Instead, the information from the node 111 may be forwarded by the node 105 to a node 115, by the node 115 to a node 117, by the node 117 to a node 119, and finally by the node 119 to the node 113. Communications from the node 113 to the node 111 may be forwarded along the same route, except in reverse order. The routing of this particular communication is illustrated in FIG. 1 as a dashed line between the linked nodes.

To accomplish this routing, each node in the network may be configured to receive information from other nodes. Each receiving node may be further configured to deliver the received information to either the user interface of the receiving node or to forward the information to a still further node by retransmitting it. In this way, one node is able to communicate with a distant node by having its communication go through a series of "hops" through one more intervening nodes.

As should be apparent in connection with the multiple links shown to the node 105, a single node can function as a forwarding node for messages from several communications taking place at the same time.

As should also be apparent, this typology can extend the reach of each node in the network beyond its individual limit, without requiring any type of centralized based station.

To minimize the traffic in the network and the associated problems that such traffic can create, the information that is transmitted by each node may be in a format that is encoded for only one other node in the network. The format of the encoding would insure that the transmitted information is only processed by the one other node in the network.

For example, the information transmitted by the node 101 may be encoded for the node 105, which, in turn, may then process that information. Although the transmission from the node 101 might be strong enough to reach the nodes 111, 115 and 121, it would not processed by these other nodes because it is not transmitted in a format that is encoded for these other nodes.

To facilitate this process, each node in the network may be configured to process information that is encoded in a format that is different from the format that each of the other nodes will process.

In FIG. 1, each node is illustrated as transmitting information in connection with a communication to only a single node. Thus, the communication between nodes 101 and 103 is illustrated as being sent by node 101 to only node 105, by node 105 to only node 107, by node 107 to only node 109, and by node 109 to only node 103. Similarly, the communication between nodes 111 and 113 is illustrated as being sent by node 111 to only node 105, by node 105 to only node 115, by node 115 to only node 117, by node 117 to only node 119, and by node 119 to only node 113.

Forwarding communications through only single nodes can make each node in the communication link critical to the success of the communication. Unfortunately, a link in the chain can be broken. For example, a mobile node that is function as a link may move beyond the range of a node that is linked to it.

Figure 2:
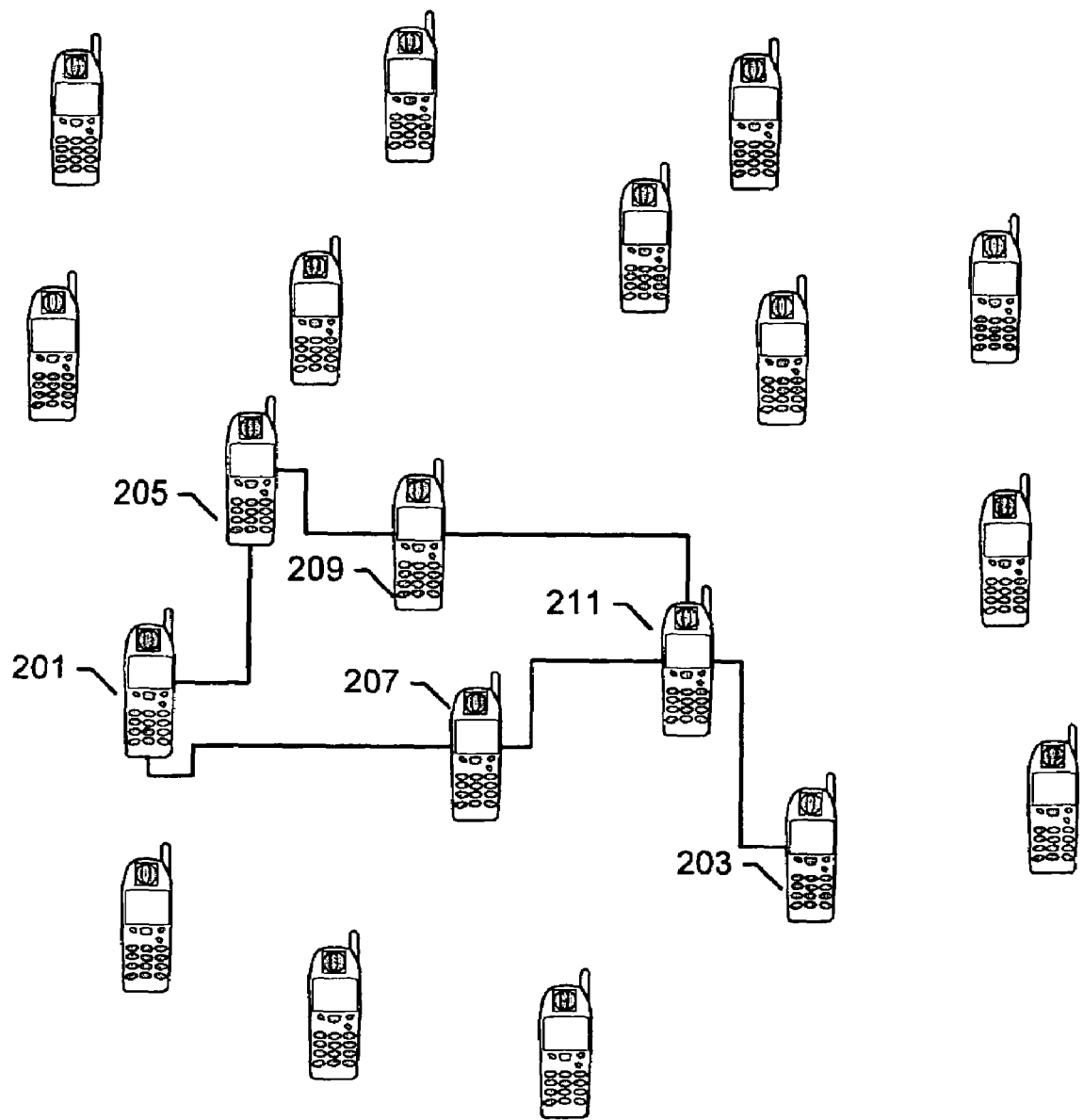
FIG. 2 illustrates a communication taking place over a portion of a network using encoded transmissions and forwarding, including at least one redundant transmission.

The system shown in FIG. 2 helps address this potential problem. FIG. 2 Illustrates a communication taking place over a portion of a network using encoded transmissions and forwarding, including at least one redundant transmission. A communication is taking place between a node 201 and a node 203. In this case, however, the node 201 encodes the communication for two separate neighbors, a node 205 and a node 207. In turn, the node 205 encodes the information for forwarding to a node 209 which forwards it to a node 211. Simultaneously, the node 207 encodes the information for forwarding to the node 211. If a link with the node 205, 207, 209 or 211 develops a problem, the communication will still reach the node 211 because it is sent over two independent paths, that is through the nodes 205 and 209 and separately through the node 207.

On the other hand, if the communications from both the nodes 207 and 209 arrive at the node 211, the node 211 may be configured to understand that it is receiving duplicates of the same communication, in which case it may be configured to discard one of the communications and to forward only the other communication to the node 203. The same process may work in reverse in connection with information that is being communicated from the node 203 to the node 201. In this case, however, it would be the node 201 that may discard a redundant transmission.

The exact number of nodes to which a single communication may be directed may be set as a fixed parameter in the network or may be allowed to vary based on the particular circumstances. When a multi-path communication is desired, the transmitting node may encode and transmit the information once in a format appropriate for the first receiving node and again in a format appropriate for each of the other receiving nodes.

There are a broad variety of techniques that may be applied to effectuate the encoding that has been discussed.

One technique is to assign the receiver in each node a specify frequency that is different from the frequencies that are received by all other nodes. To transmit information encoded for a particular node in this embodiment, the transmitting node would effectuate encoding by adjusting the frequency of its transmitter to match the receiving frequency of the other particular node.

The receiver in each particular node may instead be configured to only process received information having a particular phase or to only process received information appearing within a particular time frame. In these embodiments, the transmitting node would again encode the signal that it transmits to match.

A still further encoding approach may be assign each node a unique address and to package each communication with the address of the target receiving node.

A still further encoding approach is to use spread spectrum technology. In this embodiment, all of the nodes may transmit their information at the same time and within the same frequency band, such as in approximately a 650 MHz band that is being dedicated in the 6-7 GHz frequency range in connection with a UWB system. Each transmission may be encoded with the spreading sequence that corresponds to the dispreading sequence use by the target node.

Other encoding techniques may also be used, including a combination of techniques.

Before communication takes place, it may be advantageous to establish links between neighboring nodes. It may also be advantageous to classify these links, such as to create a primary and secondary class of links.

Figure 3:
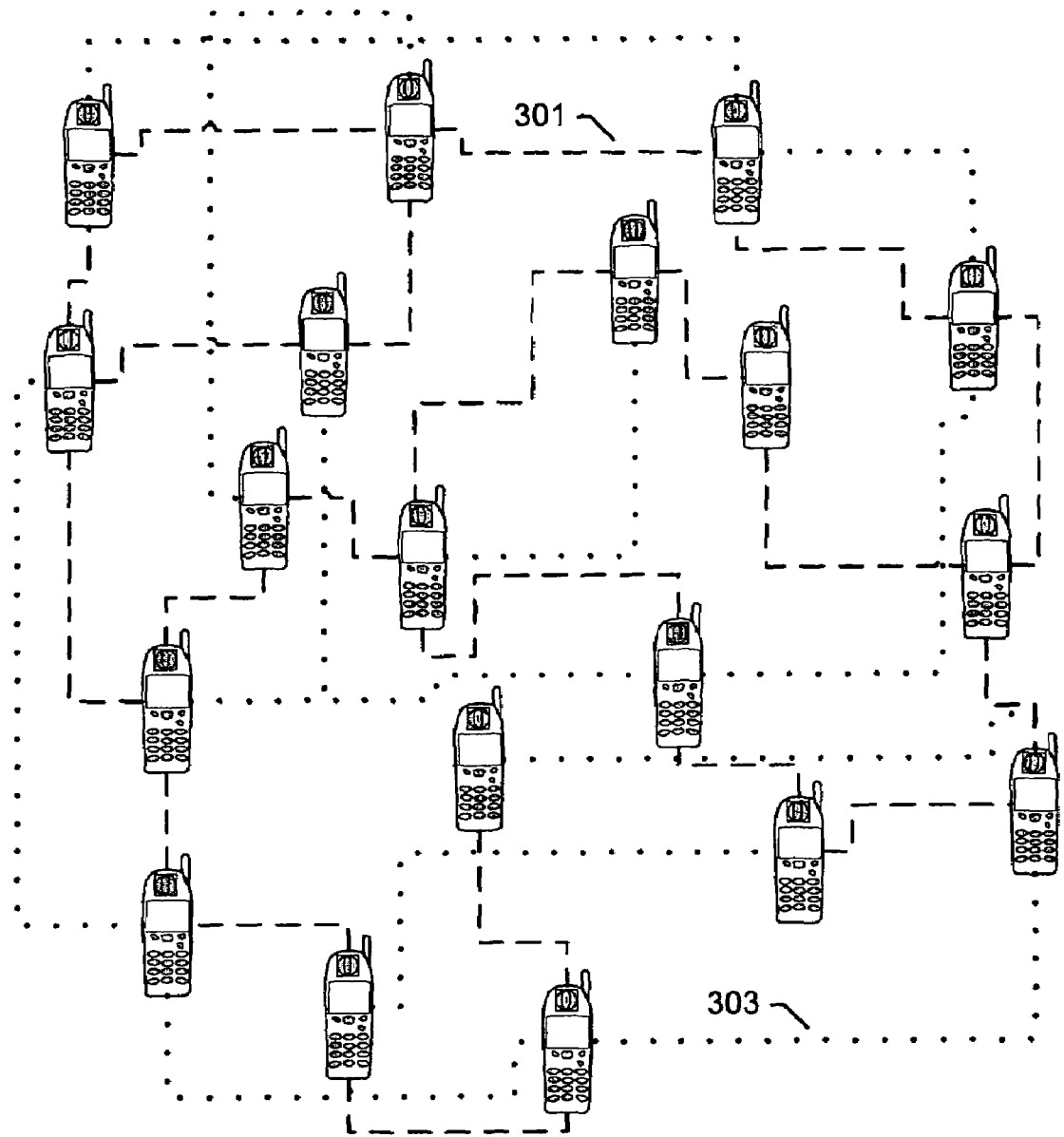
FIG. 3 illustrates primary and secondary links that have been established in a portion of a network.

FIG. 3 illustrates primary and secondary links that have been established in a portion of a network. The primary links are shown as dashed lines, such as dashed a dashed line 301. The secondary links are shown as dotted lines, such as a dotted line 303.

A primary link between nodes, such as the primary link 301, may be defined in the network as a link between two nodes over which a communication between the two nodes may take place. A secondary link, such as the secondary link 303, may be defined in the network as a link between two nodes over which communication between the two nodes may not take place. Although the secondary link may be defined as one that will not carry communications, it may still function as standby link and be promoted to a primary link in the event that a primary link become unavailable.

An illustrative process of establishing, utilizing and tearing down these links will now be presented.

Each node in the network may be configured to repeatedly transmit a pilot signal on a common channel that is received and processed by all of the nodes. If spread spectrum technology is used, all pilots from all transmitting nodes may be spread with the same spreading sequence. All receiving nodes node may be configured to de-spread all received pilot signals using this same common sequence.

Figure 4:
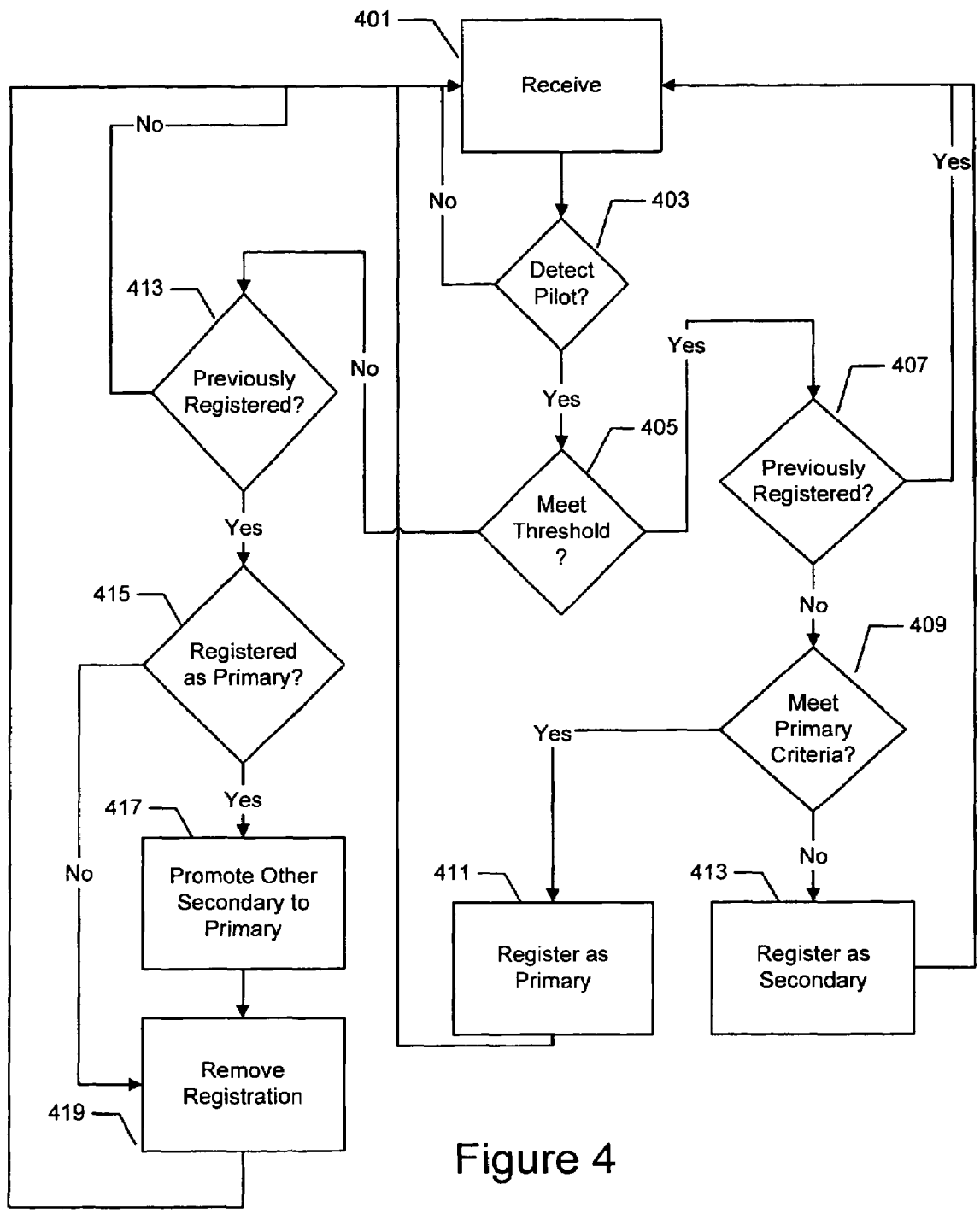
FIG. 4 illustrates how a node may create and maintain primary and secondary links in a network.

FIG. 4 illustrates how this received information may be processed by node in a network, along with other information.

The node may be in the receive mode, as reflected by a Receive block 401.

The receiving node may detect whether a pilot signal is within the received information, as reflected by Detect Pilot? decision block 403. If a pilot is detected, the carrier-to-interference ("C/I") ratio of the pilot may be compared against a threshold value, as reflected in a Meet Threshold? decision block 405. If the pilot meets the pre-determined threshold, this means that the link between the node transmitting the pilot and the node receiving the pilot is sufficiently strong to be a viable link. Of course, other signal strength parameters may also be evaluated in addition or instead.

As will be discussed below in mode detail, the transmitting node may transmit information identifying the transmitting node, along with the pilot signal. If the pilot signal meets the threshold requirement, the receiving node may next determine whether the link between the transmitting node and the receiving node has already been registered, as reflected by a Previously Registered? decision block 407. If the link has been registered, the receiving node may not process the pilot information further.

If the link has not been registered, on the other hand, the receiving node may next determine whether it should be designated a primary link, thus making it available for communication, or whether it should be designated a secondary link, and thus not be available for communication. This step is reflected in FIG. 4 by a Meet Primary Criteria? decision block 409.

A broad variety of criteria may be considered by a node in determining whether to designate a node as a primary node—thus making it available for handling communications—or a secondary node—thus leaving it as a standby link that may be promoted to a primary link in the event that another primary link becomes unavailable.

One criterion that the node may consider is the magnitude of the C/I ratio. The larger the ratio, the stronger the signal. Of course, other signal strength parameters may be considered in addition or instead. When the signal is strong, power control circuitry may enable the transmitting node to reduce the power of its transmission, thus minimizing the power that is needed for the transmission and the interference that the transmission may cause to other signals.

Another criterion may be the angular orientation of the existing primary links with the angular orientation of the new link that is being evaluated. A potential primary link at an orientation far from any orientation that is being serviced by an existing primary link may be more important than a potential primary link at an orientation that is very similar to an orientation of an existing primary link.

Angular computations may be made using a variety of technologies. For example, each node may transmit its geographic location as determined by a GPS receiver in the node, by magnetic field measurements, by signal triangulation or by any other technique. Angular calculations may then be made using simple geometry.

The anticipated stability of the link is another criterion that may be considered. A stable link may be viewed as being more valuable than an unstable link.

The relationship between the current number of primary nodes and a desired minimum number of primary nodes may also be considered. Similarly, a comparison of the current number of nodes with a maximum number of nodes may be considered. Fewer nodes may cause less interference and may better conserve energy. A larger number of nodes, on the other hand, may increase the stability of a communication, particularly when nodes are in motion. Three or four primary links per node may also be set as an ideal target.

Once the decision is made as to whether to make the link a primary link, as reflected in the Meet Primary Criteria? decision block 409, the appropriate action is taken. If the decision is to make the link a primary link, the link may be made a primary link and registered as such in the node, as reflected by a Register as Primary block 411. If the decision is made not to make the link a primary link, the link may be registered as a secondary link in the node, as reflected by a Register as Secondary block 413.

As previously indicated, each node may repeatedly issue pilot signals. If the received C/I ratio does not meet the pre-determined threshold, as determined during the Meet Threshold? determination block 405, the signal may still be strong enough to allow the receiving node to identify the transmitting node. If so, the receiving node may next investigate whether the link with the node transmitting the weak pilot was previously registered, as reflected by the Previously Registered? block 413. If the link was previously registered, the receiving node may next determine whether the link had been registered as a primary link, as reflected by a Registered as Primary? decision block 415. If the weak link was previously registered as a primary link, the receiving node may next attempt to promote a previously-registered secondary link to a new primary link, as reflected by a Promote Other Secondary to Primary block 417. The registration of the link to the node with the weak pilot signal may then be removed, as reflected by a Remove Registration block 419.

The registration of a link may also be removed if a pilot from the linked node is not received after a pre-determined time. An appropriate secondary link may then be promoted to a primary link.

By repeatedly following the process described above and illustrated in FIG. 4, each node will create and constantly maintain a set of primary and secondary links, such as the primary and secondary links shown in FIG. 3.

Figure 5:
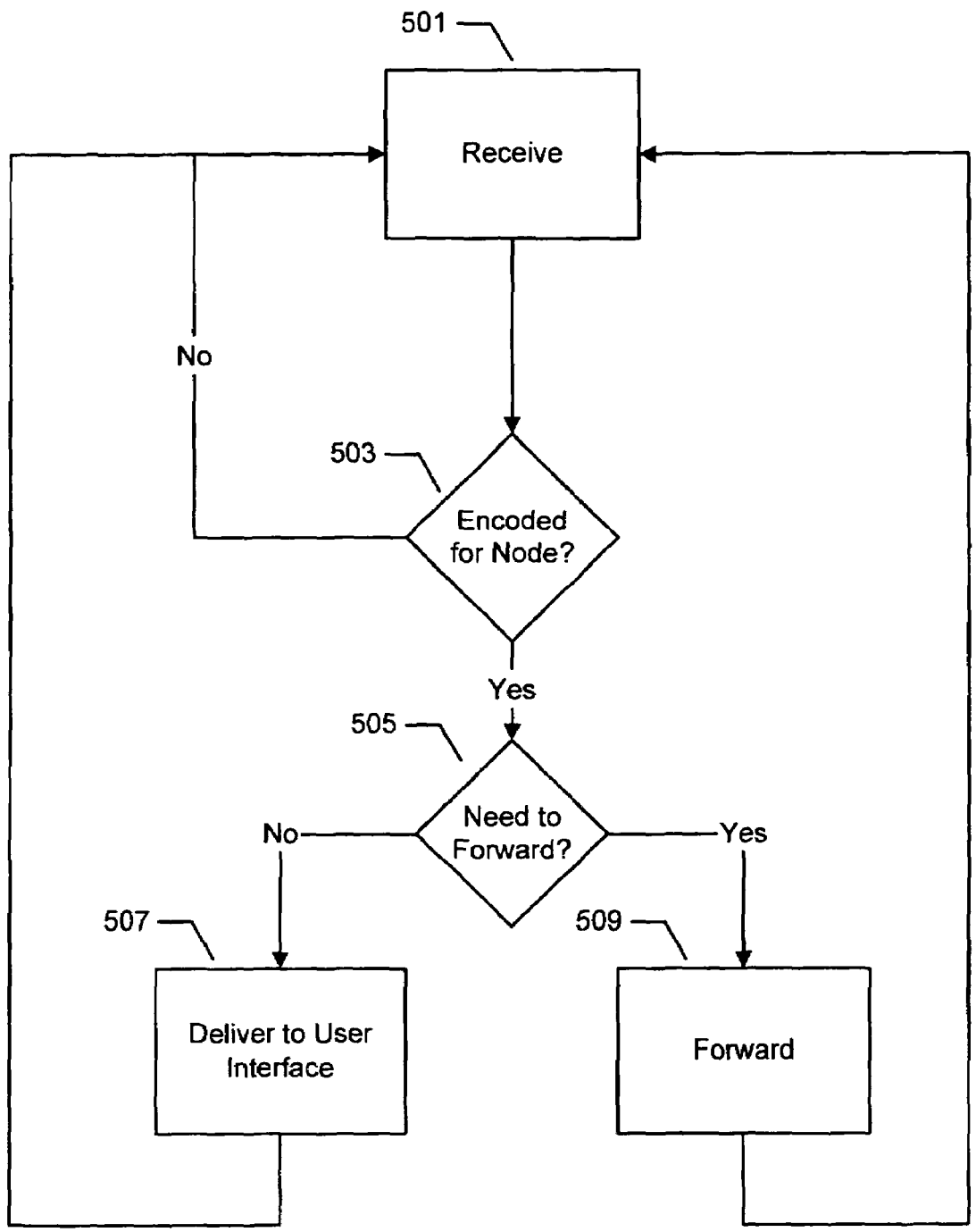
FIG. 5 illustrates a process that a node in a network may follow to process received information.

FIG. 5 illustrates a process a node may follow in a network to process received information that is encoded. Encoded information is received by the node, as reflected by a Receive block 501. This may be during the same period that the node receives a pilot, as reflected by the Receive block 401 in FIG. 4. As will be discussed in more detail below, each transmitting node may transmit both pilot and information within the same transmission period.

The receive node may next determine whether the received information is encoded for the receiving node, as reflected by an Encoded for Node? decision block 503. The exact approach taken by the receiving node for making determination may depend upon the format of the encoding.

If the encoding is based on frequency, the receiving node may simply examine the received signal to determine whether information appears at the receiving frequency of the receiving node. Appropriate filters as well as other techniques may be used.

If the information is encoded by phase, a similar process and appropriate apparatus may be followed to determine whether the information is being delivered at the phase of the receiving node.

If the information has been encoded by time division, the receiving node may simply examine the received information within its time slot.

If the information has been encoded by an addressing technique, the receiving node may examine the received information to see whether it is packaged with the address of the receiving node.

If the information is encoded using spread spectrum technology, the receiving node may de-spread the received signal using its unique spread spectrum code. As is well known in the art, this will result in the output of the information that has been encoded if the codes match.

If another encoding technique is used, then another correspondingly appropriate technique may used in the receiving node to determine whether the received signal is encoded for the node, as reflected by the Encoded for Node? decision block 503.

If the information is encoded for the node, the receiving node may process the information. It may next determine whether the information should be forwarded to another node or delivered to its user interface, as reflected by a Need to Forward? decision block 505. As discussed below in more detail, this determination may be based on instructions that accompany the information. It may also be based on other criteria.

If the information is determined to be information that should be delivered to the user interface of the node, that information may be delivered to the user interface of the node, as reflected by a Deliver to User Interface block 507. If the determination is made that the information should be forwarded, the information may be forwarded to another node, as reflected by a Forward block 509.

A broad variety of approaches may be used in connection with the forwarding of information. As part of the process, the information may be encoded for another specific node with which the forwarding node has already established a primary link. The forwarded information may also be packaged with instructions to the target node as to whether the information should be delivered to the user interface of the target node or again forwarded by the target node. Examples of more specific routing techniques and procedures are discussed below.

As part of the forwarding process, the forwarded information may be placed in a queue in the forwarding node. The information in the queue may then be transmitted by the forwarding node in accordance with a transmission schedule.

In order for a transmission from a node to be successfully received, of course, the transmitting node must transmit at a time when the receiving node is receiving.

One approach for accomplishing this is to configure each node to transmit and receive at all times. Unfortunately, such "full duplex" operation can create problems, including the need for additional bandwidth and overloading of the receiver by the transmitted signal.

Another approach is to transmit and receive at different times, which is known as "half duplex" operation. In this mode of operation, however, there must be some way for the transmitting node to know when the receiving node will be receiving so that the transmission will be received.

In some networks, a master controller provides information to a plurality of nodes about when they should transmit and/or receive, thus providing the needed synchronization. In the embodiments shown in FIGS. 1-3, however, there may not be any master controller. In these embodiments, some other form of synchronization may be provided.

One such approach is to configure each node to constantly cycle between transmitting and receiving. Each node may further be configured to vary the length of each cycle, each cycle consisting of both a transmission and a reception portion.

To facilitate synchronization, the length of each cycle may track a pre-determined pattern of lengths that each node in the network identically follows. Each node in the network may further be configured to be at a particular point in the pre-determined pattern that is different at any one moment in time from the point in the pattern at which every other node is at. By following this approach, there may always be a particular point in time when a scheduled transmission of a transmitting node will coincide with the scheduled reception of a target node with which the transmitting node wishes to communicate over a primary link.

Figure 6:
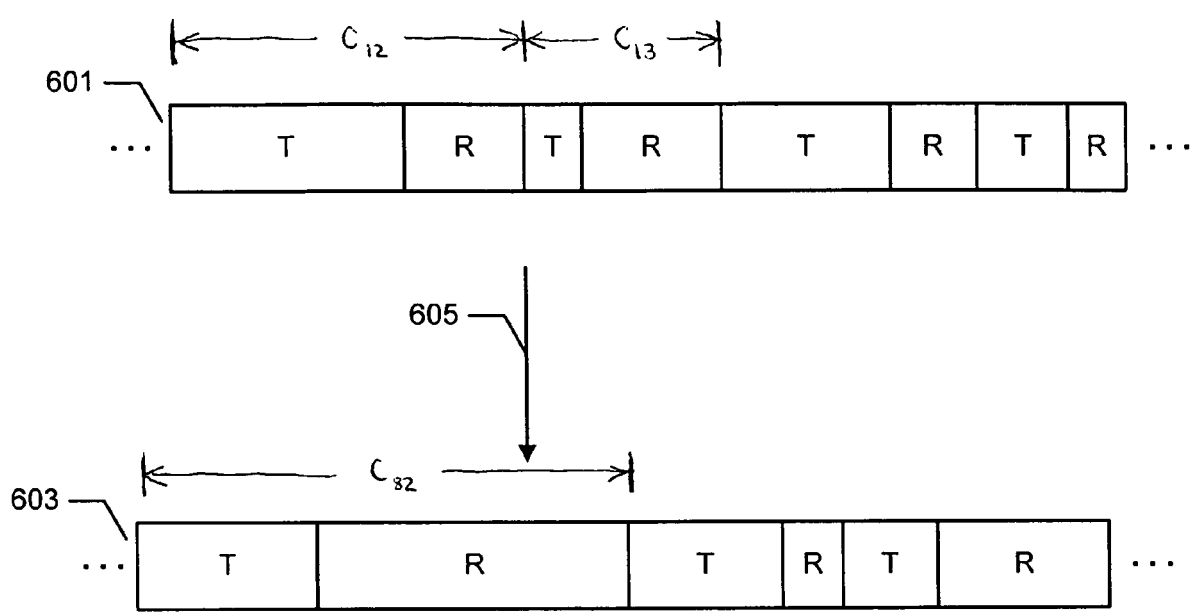
FIG. 6 illustrates randomized time division duplexing of two nodes in a network.

These concepts are illustrated in FIG. 6. Specifically, FIG. 6 illustrates the randomized time division duplexing of two nodes in a network. As shown in FIG. 6, a network node follows a Transmit/Receive pattern 601; while a second node follows a Transmit/Receive pattern 603. Each "T" in the figure represents transmission; while each "R" represents reception. Each pair of transmit and receive operations is referred to as a cycle, denominated in the figure by a "C" followed by a subscript indicating the position of the cycle within the pre-determined pattern of cycle lengths.

The pre-determined pattern of cycle lengths that is followed by both the first and second nodes may be identical. However, the second node may always at a point in the pattern that is different than the point of the network node. Thus, when the network node begins its cycle $C_{12}$, the second node may already be in its cycle $C_{82}$, as illustrated in FIG. 6.

At some point during the pattern of cycles, the initiation of a transmission by the network node will be at a time when the second node is receiving. An example of this is shown in FIG. 6 at the point in time 605. At this point in time, the second node is in the receiving portion of its cycle $C_{82}$, while the network node is just beginning to transmit in its cycle $C_{13}$. If the length of the information that needs to be transmitted from the network node will not exceed the duration of the remaining portion of the receive cycle $C_{82}$, the point in time 605 then becomes a point in time when the network node knows that it can transmit its information to the second node with confidence that the second node will receive all of it.

To accomplish this synchronization, the network node may need to know the relative offset of the second node in the pattern of cycle lengths. Since both nodes are following the identical pattern, the network node can then calculate the point in time when a scheduled transmission from the network node will be received by the second node. When transmission of information from the first to the second node is desired, the network node may then schedule the transmission of information for this slot.

Another factor that may be considered by the nodes is the ratio between the transmission and reception time within each cycle. This ratio may be fixed, as shown in FIG. 6, or may vary in accordance with network traffic or other conditions.

Many different ways may be used to store the pattern of cycle durations. One approach may be for each node to use the same pseudo-random ("PN") noise code and to have this code circulate in a set of shift registers. An offset position of each node within the pre-determined pattern may be determined by applying a hash function to an identification code in the node that is unique for each node in the network.

Figure 7:
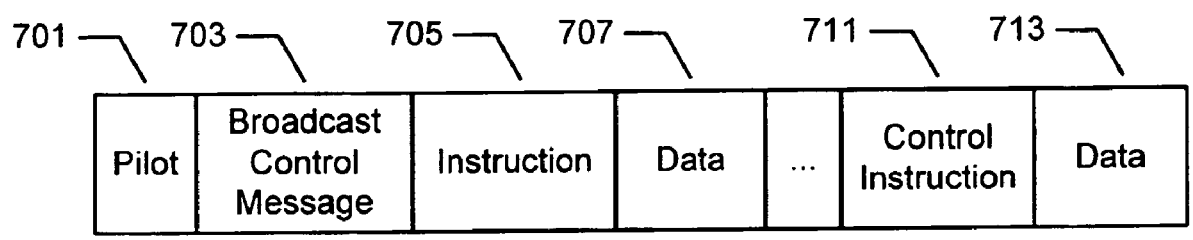
FIG. 7 illustrates components of a transmission that may be made by a node in a network.

There is a broad variety of information that may be transmitted by each node during the transmission portion of each cycle. FIG. 7 illustrates components of one such transmission that may be made by a node in a network. As shown in FIG. 7, the transmission may begin with a pilot signal 701, followed by a broadcast control message 703, followed by one or more instruction/data sets, such as instruction/data sets 705/709 and 711/713.

The pilot signal 701 may be delivered in the beginning of each transmission cycle of each node for the purpose of establishing and maintaining links between each node, as discussed above in connection with the discussion of FIG. 4.

Each pilot signal may be transmitted by each node on a common channel. The exact approach for accomplishing this, of course, may vary depending upon the technique that has been selected for communicating information between nodes.

If spread spectrum technology is used, each pilot may be spread with a common code so that it may be received and processed by every other node within transmission range. As explained above, one purpose of the pilot signal may be to allow other nodes in close proximity to determine whether a link with the transmitting node should be established (or removed) and, if so, whether it should be made a primary link (or downgraded to a secondary link). As also explained above, the strength of the received C/I ratio may be used in this determination, as well as other criteria.

Like the pilot signal, the broadcast control message 703 may also be sent over a common communication channel, such as a channel spread by each node with the same code. As explained in more detail below, the broadcast control message may enable other nodes to learn needed information about the transmitting node in order to establish (or change) a communication link with that node.

One or more pairs of instructions/data sets may then follow, such as the instruction/data set 705/709 and the instruction/data set 711/713. Each data segment may include information that is ultimately destined for a user interface, such as voice information, text information, video information or some other type of information. Each instruction segment may instruct the receiving node as to how to handle its associated data segment. For example, an instruction may indicate that the associated data segment is to be delivered to the user interface of the receiving node. Alternatively, an instruction may indicate that its associated data segment should be forwarded to another node. In regards to forwarding, specific examples of routing techniques are discussed below.

Figure 8:
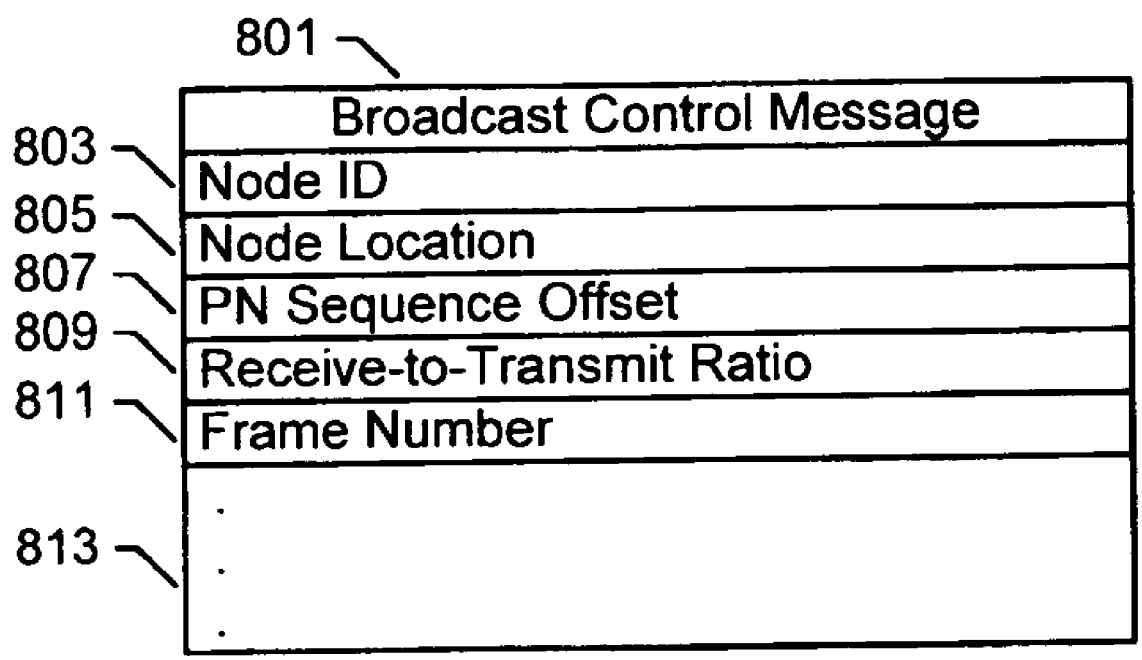
FIG. 8 illustrates components of a broadcast control message that may be transmitted by a node in a network.

FIG. 8 illustrates components of a broadcast control message that may be transmitted by a node in a network. As shown in FIG. 8, a broadcast control message 801 may include a node ID 803, the node location 805, a "PN" sequence offset 807, a Receive-to-Transmit Ratio 809, a frame number 811, as well as other information 813.

The node ID 803 may be an ID that is unique for each node in the network.

The node location 805 may be information indicative of the location of the node. This information may be useful in determining whether a receiving node should establish a link with the transmitting node. It may also be useful in determining routing paths, as discussed in more detail below.

The location of each node may be determined by any of a broad variety of techniques. One such approach may include a GPS receiver in the node operating in accordance with well known techniques.

The PN Sequence Offset 807 may indicate the node's offset in a PN sequence code. As explained above, the PN sequence code may be used to control the duration of the transmit/receive cycles. The offset in this sequence may be received and stored by the nodes that are linked to the node that is transmitting its PN Sequence Offset. Each receiving node, in turn, will then be able to determine when the transmitting node will be in the receive mode and thus will be able to schedule its transmissions to this node accordingly.

The same PN sequence code may also be used by the receiver in each node during its de-spreading operation when spread spectrum technology is used. Each node may use the identical PN sequence code, but offset by a unique amount. The PN Sequence Offset 807 that is transmitted may similarly be used by the receiving nodes that are linked to the transmitting node to communicate to them the offset that they must use when encoding information for that node.

Thus, the PN Sequence Offset 807 of a target node may be used by a transmitting node to both time and encode its transmission to the target node.

The Receive-to-Transmit Ratio 809 may be used to indicate the ratio of transmission-to-reception time within a cycle. As explained in more detail above, this ratio will further enable another node to determine when a target node will be in its receiving mode. As also explained above, this ratio may be fixed or may vary in accordance with network or other conditions.

The frame number 811 may indicate the current position of the node within the pattern of transmission/reception cycle lengths that is discussed above. It may be synonymous with the cycle numbers ("C") that are illustrated in FIG. 6.

Other types of information 813 may also be included in the broadcast control message 801. Variations on the specific fields that have been discussed above may also be made.

In addition to establishing a system of links, such as the primary and secondary links shown in FIG. 3, the network may also include appropriate systems for determining and updating the routes over which information may be sent from one node to another, such as the routes shown by the dotted and solid lines in FIG. 1 and by the solid lines in FIG. 2. In many cases, an initiating node that wishes to communicate with a destination node may not have any links established with the destination node and may not know where the destination node is. This may be particularly true when the destination node is a mobile node.

One approach for dealing with this may be for the initiating node to flood the network with a Destination Node Discovery message. In connection with the embodiments that have thusfar been described, the flooding may be initiated by the initiating node by sending the Destination Node Discovery message to each of the other nodes with whom the initiating node has a primary link and also, in certain embodiments, a secondary link. The Destination Node Discovery message may ask each linked node whether it is aware of the destination node and, if not, to forward the message to its linked nodes. This process may repeat until the Destination Node Discovery message is received by the destination node or a node that is aware of it. Upon reaching such a node, the node may return identifying information.

The initiating node may include with each Destination Node Discovery message a time-to-live parameter. This parameter may be decremented by one each time it is forwarded by another node. Once the count reaches zero, the Destination Node Discovery message may no longer be forwarded.

Including a time-to-live parameter may minimize the degree to which a network is flooded by a Destination Node Discovery message. When used, the value of the time-to-live may be selected such that it is somewhat greater than the anticipated number of hops that may be needed to reach the destination node.

The Destination Node Discovery message may also include the ID of the initiating node, along with a message identifying the destination node. This information may be used by each of the other nodes that receive this message to distinguish it from other Destination Node Discovery messages. Such information may enable each node to avoid forwarding duplicates of the same Destination Node Discovery message, even though the same message may be received in duplicate from other nodes. This may also reduce the degree of flooding.

After a destination node is located, various different approaches may be used to actually establish a routing path. One approach is location-based forwarding. With this approach, the information that is sent back may include the location of the destination node. The initiating node may also know its location and thus be able to determine an appropriate routing direction. The initiating node may also keep track of the location of each of its linked nodes. Based on all of this location information, the initiating node may then be able to identify the primary link that is most closely directed to the destination node. The initiating node may then encode the message for the node associated with this primary link and then transmit the message.

The node associated with this primary link, in turn, may receive the message and perform a similar analysis to determine the primary link over which it, in turn, will forward the message. This "hopping" process may continue until the message finally reaches the destination node. A return message may then be processed in the same manner.

As described above and illustrated in connection with FIG. 2, however, there may be situations in which a single node will initiate or forward the same message over more than a single primary link. Such an approach may be used in cases in which there may be uncertainty over the sufficiency of the operation of a needed primary link. In this situation, one or more redundant paths may be established in connection with at least portions of the routing, as shown in FIG. 2 and discussed above.

As with the Destination Node Discovery message, information messages may also be packaged with a time-to-live parameter, thus insuring that a message that is unable to reach its destination node does not endlessly travel throughout the network. Once routing is established between the initiating node and the destination node, the exact number of hops may be known. This information can be used in selecting a judicious time-to-live parameter. As the configuration of the routing changes, due to the establishment of superior links or the removal of insufficient links, the expected hop count may be updated and, along with it, the time-to-live parameter.

Similarly, and particularly in connection with destination nodes that are moving, the location of the destination node may also be updated and, along with it, the routing that is selected.

Another approach to routing is to use routing tables in each node. In this embodiment, the route that is followed by a Destination Node Discovery message between the initiating node and the Destination Node may be recorded and associated with a unique communication code that is assigned to the communication between the initiating node and the destination node.

For example, the node 101 might initiate a Destination Node Discovery message for the node 103 in FIG. 1. It might include with the Destination Node Discovery message a unique code for the communication that is being established.

The Destination Node Discovery message may also include the node ID of each node that forwards the message. Thus, by the time the Destination Node Discovery message reaches the destination node 103, the Destination Node Discovery message may include the IDs of all of the nodes through which it was forwarded, i.e., the nodes 101, 105, 107 and 109.

The destination node may then store all of the accumulated routing information that was received in its routing table. It may also respond to the Destination Node Discovery message by directing a message back over the series of links by which it came by including with the response the same history of links, along with the unique code of the communication.

Each node that receives the reply may then record in its routing table the node from which the reply came, the node to which the reply should be forwarded, and the unique number that has been assigned to the communication.

The next time a node receives a communication bearing this unique number, it may then consult its routing table to determine the link over which it should be forwarded.

Each node may also include appropriate systems for managing their routing tables. For example, each node may include a system that deletes entries in the routing table that have not been referenced for a pre-determined amount of time. Each node may also include systems that update the routing table based on changes in the network topology.

In some cases, a node may combine both location-based forwarding with routing table information. For example, a node that is implementing forwarding with routing tables may run into a situation where it receives a communication that is not listed in its routing table. In this situation, the node may forward the message using location-based forwarding.

Figure 9:
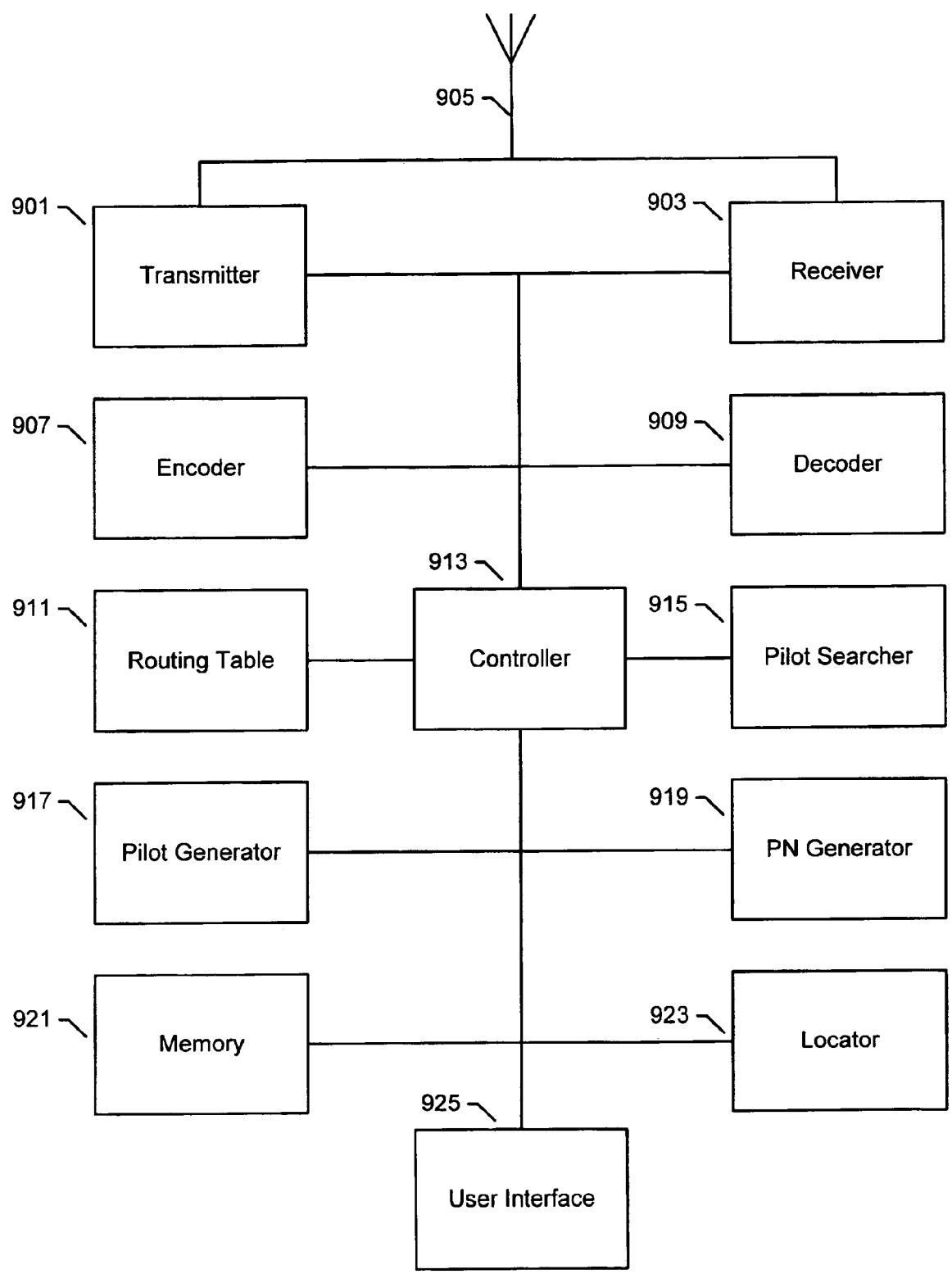
FIG. 9 illustrates a node that may be used in a network.

FIG. 9 illustrates a node that may be used in a network. As shown in FIG. 9, the node may include a transmitter 901, a receiver 903, an antenna 905, an encoder 907, a decoder 909, a routing table 911, a controller 913, a searcher 915, a pilot generator 917, a PN generator 919, a memory 921, a locator 923 and a user interface 925.

The transmitter 901 may transmit information received from the controller 913 to the antenna 905. The receiver 903 may receive information from the antenna 905 and deliver it to the controller 913. The encoder 907 may encode information for transmission, again operating under the control of the controller 913. The encoder may use any of the encoding techniques discussed above, such as frequency encoding, phase encoding, time encoding, address encoding or spread spectrum encoding.

Similarly, the decoder 909 may decode information received from the receiver 903 under the control of the controller 913. As with the encoder, the decoder 909 may decode information based on frequency, phase, time, address or a spread spectrum code.

The routing table 911 may be used to store routing information and may be used in those embodiments in which routing is accomplished in connection with a routing table.

The pilot searcher 915 may be used in association with information received by the receiver 903 under the control of the controller 913 to search received information for pilots.

The pilot generator 917 may be used to generate pilots that, under the control of the controller 913, are transmitted by the transmitter 901.

The PN generator 919 may be used to generate one or more PN sequence codes that, under the control of the controller, may be used by the node to spread information for other nodes, to de-spread information from other nodes, to control the times during which the node transmits and receives, and to determine the times during which a linked node is scheduled to receive information, all as explained above in more detail.

The locator 923 may determine the location of the node. It may include a GPS receiver. It may instead use magnetic location techniques or determine location based on one or more signals that are received by the node. Other location techniques may also be used.

The user interface 925 facilitates communication between the node and the user of the node. As discussed above in more detail in connection with FIG. 1, the user interface may include one or more input devices, such as a keyboard, mouse, touch screen, microphone, camera or a communication link with another system. Similarly, the user interface may include one or more output devices, such as a display, loudspeaker, headset or a communication link with another system.

The memory 921 may be used by the controller and/or other components of the node to store information needed by the node, permanently and/or temporarily, such as information from the user interface, information for the user interface, location information, PN codes, pilot information, routing information, encoding information and/or decoding information.

The node may include additional components and/or may not include all of the components discussed above in connection with FIG. 9. For example, one or more nodes on the network might not include a user interface and thus might not sink or source data, but merely act as forwarding nodes and/or provide other communication services to other nodes on the network.

The node may also include power control systems to control the power level of the signals that are transmitted. Such systems may be open loop and set the power level to a target node based on the strength of the signal that is received from that node. Such systems may be closed loop and allow the power level of the node to be set by another node, such as a node that is receiving the signal from the node whose power level is being set. A combination of these approaches may also be used.

The randomized time division duplex feature that has been discussed above may be used in conjunction with the encoding feature that has also been discussed above or without it. Similarly, the encoding feature may be used with or without the time division duplex feature.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

The description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the scope of this application is not intended to be limited to the embodiments shown herein but is to be accorded the widest scope consistent with the principles and novel features disclosed herein.

What is claimed is:

1. A network node comprising:
   a wireless transmitter;
   a wireless receiver;
   a user interface;
   a processor in communication with the transmitter, receiver and user interface, wherein the processor is configured to determine if received information is specifically encoded for the network node and to conduct no further processing of the information if the information is not specifically encoded for the network node; and
   a controller in communication with the processor, wherein at least one of the controller or processor are configured to cause:
      received information determined to be specifically encoded for the network node:
         to be delivered to the user interface, based on a determination by the processor that the information is intended for the network node,
         to be transmitted by the transmitter, based on a determination by the processor that the information in intended to be forwarded to a different target network node, and
      generated information to be encoded in a format specifically associated with a designated target network node and to transmit, via the transmitter, the generated and specifically encoded information to the designated target network.

2. The network node of claim 1 further including a memory and wherein the controller is configured to store information in the memory about links between the network node and a plurality of other nodes.

3. The network node of claim 2 wherein the processor is further configured to determine whether each of the links should or should not be used by the network node to communicate information and to store those determinations in the memory.

4. The network node of claim 3 wherein the processor is further configured to repeatedly determine whether each of the links is functioning at a threshold level.

5. The network node of claim 4 wherein the controller is further configured to change the stored determination that a link should not be used to communicate information to a determination that the link should be used to communicate information upon determining that another one of the links is no longer functioning at the threshold level.

6. The network node of claim 2 further including a pilot searcher and wherein the controller is further configured to cause the pilot searcher to search information that is received by the receiver for the purpose of locating a pilot signal sent by a pilot-transmitting node.

7. The network node of claim 6 wherein the controller is further configured to store information in the memory about a link between the network node and the pilot-transmitting node if the received pilot signal exceeds a threshold level.

8. The network node of claim 2 wherein the processor is further configured to specifically encode the generated information transmitted by the transmitter for the designated target network node based upon the location of designated target network node.

9. The network node of claim 2 wherein the processor is further configured to specifically encode the generated information transmitted by the transmitter for the designated target network node based upon a routing table stored within the network node.

10. The network node of claim 2 wherein the controller is further configured to cause the transmitter to transmit a query to a plurality of the other nodes requesting information about a node with whom the network node wishes to communicate and about which there is no link information stored in the memory.

11. The network node of claim 1 wherein the controller is further configured to cause the transmitter to transmit encoding information indicating the encoding that is necessary for information to be processed by the network node.

12. The network node of claim 11 further including a pseudorandom noise code generator configured to generate a pseudorandom noise code and wherein the encoding information includes an offset within the pseudorandom noise code.

13. The network node of claim 1 further including a pilot generator configured to generate a pilot signal and wherein the controller is further configured to cause the transmitter to transmit the pilot signal.

14. The network node of claim 13 wherein the pilot signal is transmitted by the transmitter on a common channel.

15. The network node of claim 1 wherein the controller is further configured to cause the generated information transmitted by the transmitter to include an instruction as to whether the transmitted information should be delivered to a user interface of an intermediary target node or whether the intermediary target node should forward the transmitted information to another intermediary target node or the designated target network node.

16. The network node of claim 1 further including a location generator configured to determine the location of the network node and wherein the controller is configured to cause the transmitter to transmit the location of the network node.

17. The network node of claim 1 wherein the controller is configured to cause the information that is transmitted and received to be processed by spread spectrum technology.

18. The network node of claim 1 configured to function as a cell phone.

19. The network node of claim 1 wherein the controller is configured to also cause the information that is transmitted to one or more intermediary target network nodes.

20. The network node of claim 1 wherein the network node is configured to communicate with other nodes, each of which contains the components recited in claim 1.

21. The network node of claim 20 wherein the encoding that is necessary for information to be processed by the network node is different from the encoding that is necessary for information to be processed by each of the other nodes.

22. The network node of claim 20 wherein the controller is further configured to cause the transmission of the information to one of the other nodes to be at a time when the one of the other nodes is receiving information.

23. The network node of claim 20 wherein the network node transmits and receives at different times and wherein the time when the network node transmits or receives is not controlled by a system that controls when other nodes transmit or receive.

24. The network node of claim 1 wherein the different target network node and the designated target network node are different nodes.

25. The network node of claim 1 wherein the different target network node and the designated target network node are the same node.

26. A process of operating a network node comprising:
  receiving information at the network node;
  determining if the received information is specifically encoded for the network node and to conduct no further processing of the information if the information is not specifically encoded for the network node;
  delivering the received information determined to be specifically encoded for the network node to a user interface in the network node based on a determination that the received information is intended for the network node;
  transmitting the received information determined to be specifically encoded for the network node to a different target network node based on a determination that the received information is intended to be forwarded to the different target network node;
  generating information at the network node;
  encoding the generated information in a specific format associated with a designated target network node; and
  transmitting the specifically encoded information to the designated target network note.

27. The process of claim 26 further comprising storing information about links between the network node and a plurality of other nodes.

28. The process of claim 27 further including determining whether each of the links should or should not be used by the network node to communicate information and storing those determinations.

29. The process of claim 28 further including repeatedly determining whether each of the links is functioning at a threshold level.

30. The process of claim 29 further including changing the stored determination that a link should not be used to communicate information to a determination that the link should be used to communicate information upon determining that another one of the links is no longer functioning at a threshold level.

31. The process of claim 27 further including searching information that is received at the network node for the purpose of locating a pilot signal sent by a pilot-transmitting node.

32. The process of claim 31 further include storing information about a link in the network node to the pilot-transmitting node if the received pilot signal is greater than a threshold level.

33. The process of claim 27 wherein encoding the generated information further comprises encoding the generated information based upon the location of the designated target network node.

34. The process of claim 27 wherein encoding the generated information further comprises encoding the generated information based upon a routing table in the network node.

35. The process of claim 27 further including transmitting a query to a plurality of the other nodes requesting information about a node with whom the network node wishes to communicate and about which the network node has no stored link information.

36. The process of claim 26 further including transmitting encoding information indicating the encoding that is necessary for information to be processed by the network node.

37. The process of claim 36 wherein the encoding information includes an offset within a pseudorandom noise code.

38. The process of claim 26 further including transmitting a pilot signal.

39. The process of claim 38 wherein the pilot signal is transmitted on a common channel.

40. The process of claim 26 wherein generating information further comprises generating an instruction as to whether the transmitted information should be delivered to the user interface of an intermediary target node or whether the intermediary target node should forward the transmitted information to an another intermediary target node or the designated target network node.

41. The process of claim 26 wherein the location of the network node is transmitted from the network node.

42. The process of claim 26 wherein the information that is transmitted and received is processed by spread spectrum technology.

43. The process of claim 26 wherein the network node operates as a cell phone.

44. The process of claim 26 wherein information that is transmitted by the transmitter is also encoded for an intermediary target node.

45. The process of claim 26 further comprising moving the network node during the receiving or transmitting.

46. The process of claim 26 further comprising the network node communicating with a plurality of other nodes, each of which is configured to perform the process recited in claim 26.

47. The process of claim 46 wherein the encoding that is necessary for information to be processed by the network node is different from the encoding that is necessary for information to be processed by each of the other nodes.

48. The process of claim 46 wherein the transmission of the information to one of the other nodes is at a time when the other node is receiving information.

49. The process of claim 46 wherein the network node transmits and receives at different times and wherein the times when the network node transmits and receives is not controlled by a system that controls the times when other nodes transmit or receive.

50. The process of claim 26 wherein the different target network node and the designated target network node are different nodes.

51. The process claim 26 wherein the different target network node and the designated target network node are the same node.

52. A network node comprising:
  means for receiving information;
  means for determining if the received information is specifically encoded for the network node and to conduct no further processing of the information if the information is not specifically encoded for the network node;
  means for delivering information determined to be specifically encoded for the network node to a user interface in communication with the network node based on a determination that the received information is intended for the network node;
  means for delivering the received information determined to be specifically encoded for the network node to a different target network node based on a determination that the received information is intended to be forwarded to the different target network node;
  means for generating information at the network node;
  means for encoding the generated information in a specific format associated with a designated target network node; and
  means for delivering the specifically encoded information to the designated target network node.

53. A computer program product, comprising:
  computer readable media embodying;
  a first set of codes for causing a computer to receive information at a network node;
  a second set of codes for causing the computer to determine if the received information is specifically encoded for the network node and to conduct no further processing of the information if the information is not specifically encoded for the network node;

a third set of codes for causing the computer to deliver the received information determined to be specifically encoded for the network node to a user interface in the network node based on a determination that the received information is intended for the network node;

a fourth set of codes for causing the computer to transmit the received information determined to be specifically encoded for the network node based on a determination that the received information is intended to be forwarded to the different target network node;

a fifth set of codes for causing the computer to generate information at the network node;

a sixth set of codes for causing the computer to encode the generated information in a specific format associated with a designated target network node; and a seventh set of codes for causing the computer to transmit the specifically encoded information to the designated target network node.

* * * * *